United States Patent
Albou

(10) Patent No.: US 8,851,724 B2
(45) Date of Patent: Oct. 7, 2014

(54) HEADLIGHT FOR A MOTOR VEHICLE

(75) Inventor: Pierre Albou, Paris (FR)

(73) Assignee: Valeo Vision, Bobigny (FR)

(*) Notice: Subject to any disclaimer, the term of this patent is extended or adjusted under 35 U.S.C. 154(b) by 219 days.

(21) Appl. No.: 13/603,664

(22) Filed: Sep. 5, 2012

(65) Prior Publication Data

US 2013/0058117 A1 Mar. 7, 2013

(30) Foreign Application Priority Data

Sep. 5, 2011 (FR) .................................. 11 57840

(51) Int. Cl.
*B60Q 1/04* (2006.01)
*F21S 8/10* (2006.01)

(52) U.S. Cl.
CPC ............. *F21S 48/1388* (2013.01); *B60Q 1/04* (2013.01); *F21S 48/1163* (2013.01); *F21S 48/1266* (2013.01)
USPC .......................................... 362/516; 362/539

(58) Field of Classification Search
CPC ........................................................ B60Q 1/04
USPC .......................................... 362/516, 538, 539
See application file for complete search history.

(56) References Cited

U.S. PATENT DOCUMENTS

| | | | |
|---|---|---|---|
| 7,682,057 B2 | 3/2010 | Albou | |
| 7,726,859 B2* | 6/2010 | Naganawa et al. | 362/539 |
| 2006/0002130 A1 | 1/2006 | Albou | |
| 2007/0058386 A1 | 3/2007 | Albou | |
| 2007/0230204 A1* | 10/2007 | Tatsukawa | 362/539 |
| 2008/0025036 A1* | 1/2008 | Takada et al. | 362/523 |
| 2009/0103323 A1* | 4/2009 | Ishida | 362/538 |

FOREIGN PATENT DOCUMENTS

| | | |
|---|---|---|
| EP | 1610057 | 12/2005 |
| EP | 1762776 | 3/2007 |
| EP | 2131098 | 12/2009 |
| EP | 2278217 | 1/2011 |
| FR | 2940404 | 6/2010 |

* cited by examiner

*Primary Examiner* — David V Bruce
(74) *Attorney, Agent, or Firm* — Jacox, Meckstroth & Jenkins

(57) ABSTRACT

A headlight for a motor vehicle, in order to provide a cut-off light beam, comprising: a collector mirror of an ellipsoidal type with an optical axis; a source of light (S) placed in the vicinity of the inner focal point of the collector mirror; a substantially flat bender, the reflective surface of which is oriented towards the interior of the collector mirror, and has an edge which is situated in the vicinity of the other focal point of the collector mirror, and a lens, situated to the front of the collector mirror and the bender, in order to provide an image of the edge of the bender.

18 Claims, 3 Drawing Sheets

HEADLIGHT FOR A MOTOR VEHICLE

CROSS-REFERENCE TO RELATED APPLICATIONS

This application claims priority to French Application No. 1157840 filed Sep. 5, 2011, which application is incorporated herein by reference and made a part hereof.

BACKGROUND OF THE INVENTION

1. Field of the Invention

The present invention relates to a headlight for a motor vehicle, in order to provide a cut-off light beam.

A typical headlight with cut-off light beam comprises:
a collector mirror with an axis;
a source of light placed in the vicinity of the inner focal point of the collector mirror;
a substantially flat bender, the reflective surface of which is oriented towards the interior of the collector mirror, and has an edge which is constituted by a flat curve; and
a lens, situated to the front of the collector mirror and the bender, in order to provide an image of the edge of the bender which defines the cut-off of the beam.

2. Description of the Related Art

In a headlight of this type, the form of the lens is generally determined a posteriori by calculation in order to obtain the light beam required, once the characteristics of the source, the collector mirror and the bender have been determined.

In particular, it is possible to determine the form of the lens section by section, by solving a system of equations for the purpose of optimizing the cut-off profile.

A headlight of this type is known, in particular from the documents FR 2 940 404 and EP 1 610 057, which EP document is equivalent to U.S. Patent Publication No. 2006/0002130 which issued as U.S. Pat. No. 7,682,057, all of which are incorporated herein by reference and made a part hereof, in the name of the applicant company. According to these documents, the lens is determined such as to provide an infinity image from a point of the edge of the bender.

However, all the calculations carried out are based on the hypothesis of use of a localized source of light. In fact it is usual to proceed in this manner, but when the focal point of the collector mirror is small and the source of light is more voluminous, such as, for example in the case of use of a high-power light-emitting diode, it is not uncommon for the focal distance to be of the same order of magnitude as the transverse dimension of the source of light. Significant aberrations then arise, and detract considerably from the quality of the light beam.

This phenomenon occurs more often in the case of a module with a convergent beam.

SUMMARY OF THE INVENTION

The object of the invention is above all to provide a headlight which makes possible a flat cut-off, without the light rising, even with a wide source of light and toric non-stigmatic convergent lenses which are conjugated with a reflector and a bender.

According to the invention, a headlight for a motor vehicle of the type previously defined is characterized in that the lens is determined such that, for each section of the lens, along a plane which is at right angles to the edge of the bender, on a point of this edge, the focal point of the section is at a distance from the point of the edge of the bender, according to a direction at right angles to the plane of the bender.

Generally, the bender is horizontal, and the focal point of the section is at a vertical distance from the edge of the bender.

Preferably, the distance is variable according to the position of the point of the edge of the bender.

Advantageously, for each section of the lens along a plane which is at right angles to the edge of the bender, on a point of this edge, the high part of the section which is situated above the plane of the bender makes possible a focal point which is at a distance from the edge of the bender according to a direction at right angles to the plane of the bender, whereas the low part of the section which is situated above the plane of the bender makes possible a focal point which is at another distance from the edge of the bender, according to a direction at right angles to the plane of the bender.

Preferably, the distances of the focal points of the high and low parts of the lens to the edge of the bender vary in inverse proportion, from the center of the edge of the bender towards its lateral ends.

Advantageously, in the case of a headlight with horizontal cut-off, for the high part of the lens, the distance from the focal point of a section to the edge of the bender decreases from the center of the edge of the bender towards its lateral ends, and, for the low part of the lens, the distance from the focal point of a section to the edge of the bender increases from the center of the edge of the bender towards its lateral ends. For the high part of the lens, the distance from the focal point to the edge of the bender can be zero at the center, this distance becoming negative in the direction of the lateral ends of the edge, whereas, for the low part of the lens, the distance from the focal point to the edge of the bender can be zero at the lateral ends of the edge of the bender, and negative at the center.

In the case of a convergent module, the lens can comprise a front surface with an active area and at least one non-active area. The surface of the active area can be smaller than the surface of the entry surface of the lens.

These and other objects and advantages of the invention will be apparent from the following description, the accompanying drawings and the appended claims.

BRIEF DESCRIPTION OF THE ACCOMPANYING DRAWINGS

Other characteristics and advantages of the invention will become apparent in the following description which is provided with reference to the attached drawings, but does not have any limitative nature. In these drawings.

DETAILED DESCRIPTION OF THE PREFERRED EMBODIMENTS

Figure 1:
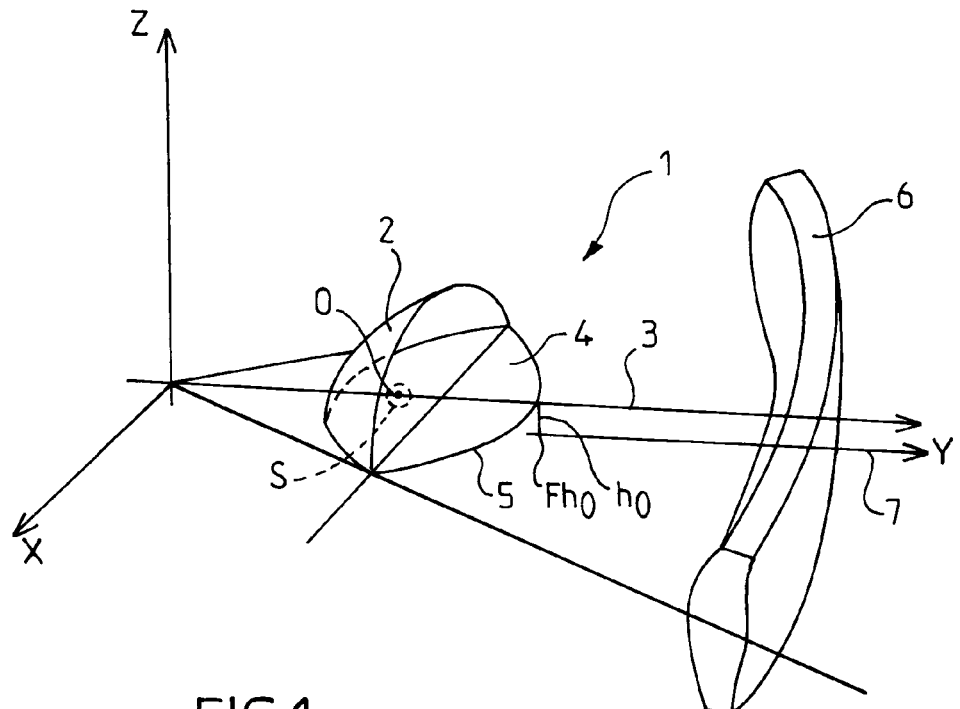
FIG. 1 is a schematic representation in perspective of a headlight according to the invention.
Figure 2:
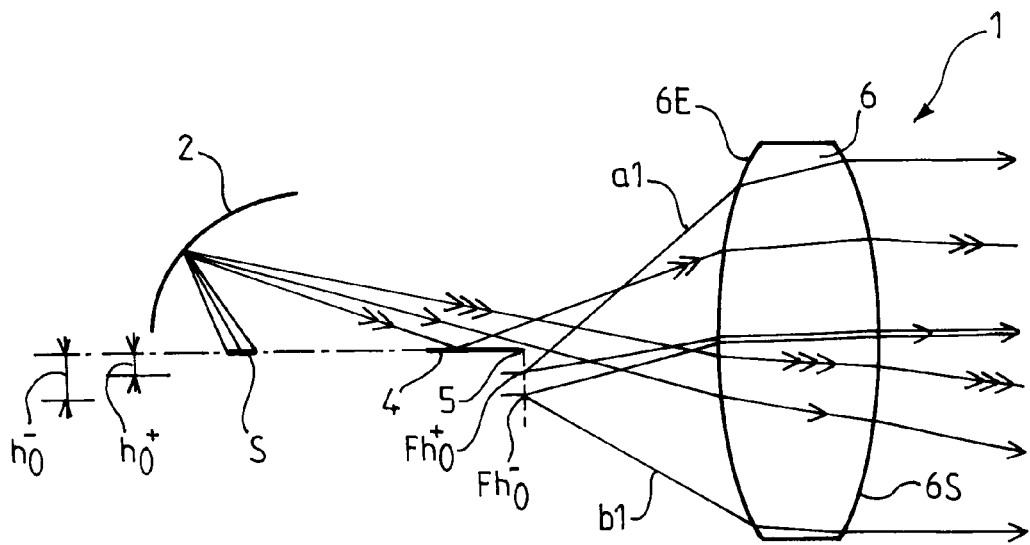
FIG. 2 is a schematic representation in perspective of a partial vertical section, illustrating the path of the rays of light.
Figure 3:
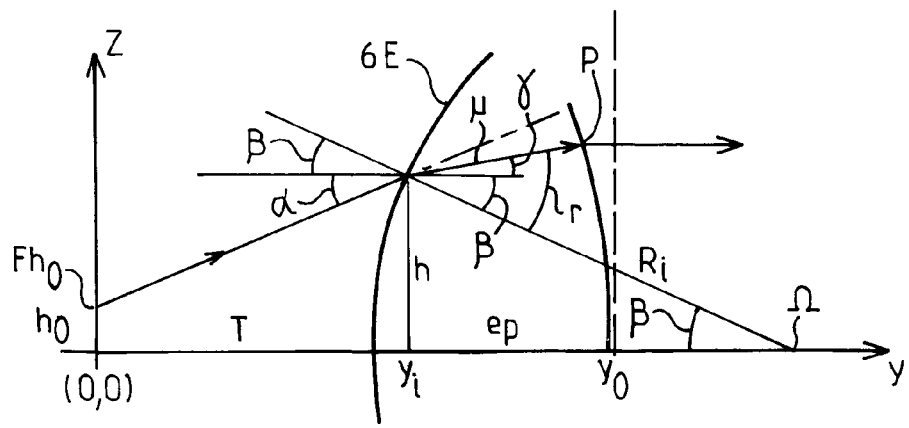
FIG. 3 is a schematic representation in cross section on a vertical plane, for the calculation of a section of the lens.

With reference to FIGS. 1, 2 and 3, it can be seen that a headlight 1 according to the invention comprises a concave collector mirror 2 with an axis 3.

The headlight 1 is designed to be installed on a motor vehicle (not represented), the concavity of the collector mirror 2 being oriented substantially towards the front of the vehicle. In the description of the different elements which constitute the headlight 1, the terms "vertical", "horizontal", "upper" or "lower" refer to the position of the headlight 1 once it has been put into place on a motor vehicle.

The headlight 1 also comprises a bender 4 constituted by a mirror, the reflective surface of which is oriented towards the interior of the collector mirror 2. The bender 4 is arranged on a plane which contains the axis 3. The bender 4 comprises an edge 5 constituted by a flat curve, the image of which, provided by a lens 6 which is arranged at the front, defines the cut-off of the light beam emitted by the headlight 1. The lens 6 comprises an optical axis 7 parallel to the axis 3.

In the reference illustrated in the figures, the y axis is the optical axis of the module, combined with the axis 3 of the mirror 2, which is generally horizontal. The z axis is a vertical axis. The edge of the bender 4 is contained on the plane z=0. The axis of the abscissae x is horizontal, at right angles to the plane formed by the y axis and the z axis.

A source of light S is arranged such that a point of the emitter, which is generally the point with maximum emission of light, is combined with the inner focal point O of the collector mirror 2. The pseudo-focal distance of the collector mirror 2 can be short, and in particular approximately 2.5 mm (the pseudo-focal distance is equal to the distance from the point O to the base of the reflector, i.e. the point of the reflector with the smallest co-ordinate according to y). The source of light can be constituted by a power light-emitting diode or LED, which in particular has a rectangular form, and the large dimension of which is oriented transversely to the y axis. This large dimension of the LED can be 5 mm.

Advantageously, the form and characteristics of the entry surface 6E or entry diopter of the lens 6 are selected, and the exit diopter is calculated as described hereinafter.

During calculation of a section of the lens 6 on a plane at right angles to the edge 5, at a point of this edge 5, in the manner described in FR 2 940 404, a focal point $Fh_0$ is selected which is situated at a vertical distance from the point of the edge 5 through which the construction plane passes.

The focal point $Fh_0$ can be above the plane of the bender 4, as shown in the diagram in FIG. 3, in which case $h_0$ is positive, or it can be below the plane of the bender 4 as illustrated in FIG. 2 for a cut-off beam of the low-beam or anti fog type, in which case $h_0$ is negative.

The vertical distance $h_0$ from the focal point $Fh_0$ to the edge 5 will depend on the position of the point concerned on this edge 5. In the embodiment concerned, this height $h_0$ is selected according to the abscissa x of the point of the edge 5.

A ray which is reflected by the bender 4 is then deflected by the high part of the lens 6, situated above the plane of the bender 4, whereas a ray which is not reflected by the bender 4 is deflected by the low part of the lens 6, situated below the plane of the bender 4. The optical paths of these rays will be different, and it is preferable to treat the calculation of the high and low parts of the lens 6 differently.

The vertical distance $h_0$ from the focal point $Fh_0$ to the edge 5 will therefore depend on:

the point concerned of the edge 5 of the bender 4, via which the vertical cross-sectional plane at right angles to the edge 5 passes; the vertical distance $h_0$ can in particular vary according to the abscissa x of the point concerned; and the high or low part of the lens 6 which is calculated.

This vertical distance from the focal point $Fh_0$ will be known as $h_0^+$ for the high part of the lens 6, and $h_0^-$ for the low part of the lens 6. The corresponding focal point will be designated by $F h_0^+$ and $F h_0^-$.

For the calculation, the limit of the high side and the low side of the lens 6 is defined by the limit height $h_l[h_0^+(x)]$ or $h_l[h_0^-(x)]$ of the point on the toric entry diopter which corresponds to the common point $(y,z)=(y_0,0)$ of the sections of the high and low parts of the exit surface of the lens 6.

In the following calculations, the y axis is the horizontal axis which is contained on the construction plane at right angles to the edge 5 of the bender 4, and passes via the point of the edge of the abscissa x in the absolute reference, which is the point of origin of the local construction reference.

The absolute reference is a reference which is independent from the section concerned, the y axis is then the optical axis of the module or headlight 1; and the z axis is a vertical axis, both in the absolute reference and in the construction references of the sections of the lens 6. The z dimensions are identical in these different references, since the edge 5 of the bender 4 is contained on the plane z=0 of the absolute reference.

Figure 4:
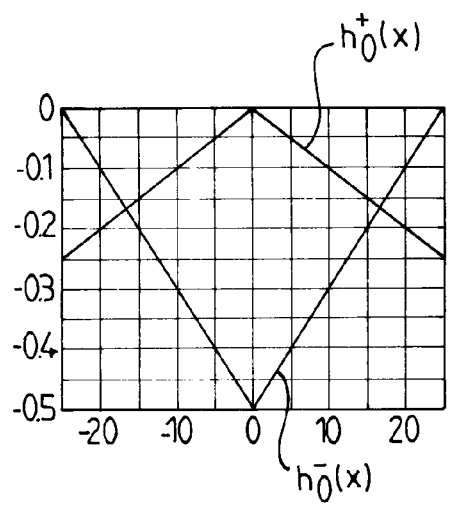
FIG. 4 is a representation of the curves illustrating the variations of the vertical distances of the focal point, $h_0^+$ for the high part, and $h_0^-$ for the low part, shown on the y-axis, according to the abscissa of the point of the edge of the bender, shown on the x-axis, via which the plane of the section concerned passes.

For the high part of the lens 6, the rising light is obtained from the edges of the central images which reach the lateral ends of the bender 4, and it is therefore appropriate to take $h_0^+(x)$ decreasing from the center of the edge of the bender 4 towards its lateral ends, and it is possible to obtain $h_0^+(0)=0$ (see FIG. 4).

For the low part of the lens 6, the rising light is obtained from the edges of lateral images which pass via the center of the bender 4. It is therefore necessary to take $h_0^-(0)<0$ and it is possible to take $h_0^-(x)$ increasing from the center of the edge of the bender 4 towards its lateral ends. Preferably, $h_0^-=0$ at the ends of the front edge of the bender 4 (see FIG. 4).

The calculation of the lens 6 is carried out with reference to FIG. 3, section by section on vertical planes at right angles to the successive points of the edge 5 of the bender 4, formed by a curve which can be selected.

The entry diopter 6E, or entry surface of the section of the lens 6 is selected as an arc of a circle which is convex towards the mirror, and has a radius Ri, which is centered on a point Ω on the y axis. The value of the distance T from the focal point of the section of the lens 6 to the point of the entry diopter on the y axis is selected. This thickness of the section of the lens 6 according to the y axis is designated by $e_p$.

The objective of the calculation is to determine the exit diopter of the lens 6 at the high and low parts.

In FIG. 3, $h_0$ has been selected as positive and the focal point $F h_0$ is situated above the edge of the bender 4. The calculation applies irrespective of the sign of $h_0$, and therefore regardless of whether the focal point is above or below the edge of the bender 4.

A common point of the diopter or entry surface 6E, with an altitude h according to the z axis, is seen from the center of the diopter with an angle β:

$$\beta = \arc \sin(h/R_i)$$

The co-ordinate $y_i$ of this common point, according to the y axis, is expressed as:

$$y_i = T + Ri - Ri \cos \beta$$

A radius obtained from the focal point $Fh_0$ falls on the common point with an angle $\alpha$ relative to the horizontal, wherein:

$$\alpha = \arctg[(h - h_0)/y_i]$$

$n_l$ designates the index of refraction of the lens 6, and r designates the angle of refraction. The axis of incidence relative to the diopter, at the common point concerned, is combined with the geometric radius obtained from the center $\Omega$. The angle of incidence is equal to $\alpha + \beta$. The law of refraction is then written as:

$$n_l \sin r = \sin(\alpha + \beta)$$

$\gamma$ designates the angle of the refracted ray to the parallel line (horizontal) on the y axis,
wherein $\gamma = r - \beta$
$y_0$ designates the co-ordinate of the point of the diopter or exit surface on the y axis; it is possible to write:

$$y_0 = T + e_p$$

K designates the optical path between the focal point $Fh_0$ of the section of the lens 6 and the vertical flat exit wave tangent to the exit diopter at the point situated on the y axis. The length, or modulus, of the optical ray refracted between the entry diopter and the point P of the exit diopter is designated by $\mu$. Consequently:

$$[\sqrt{(y_i^2 + (h - h_0)^2)}] + n_l \mu + y_0 - y_p = K$$

where $y_p = y_i + \mu \cos \gamma$
therefore $(n_l - \cos \gamma)\mu = K - (y_0 - y_i) - [\sqrt{(y_i^2 + (h - h_0)^2)}]$
and $z_p = h + \mu \sin \gamma$
thus $y_p(h_0, K, h)$
and $z_p(h_0, K, h)$, co-ordinates of the point P of the exit diopter.
$h_\rho(h_0)$ and $K(h_0)$ are defined such that $y_p[h_0, K(h_0), h_\rho(h_0)] = y_0$
and $z_p[h_0, K(h_0), h_\rho(h_0)] = 0$
$h_\rho(h_0)$ and $K(h_0)$ are solutions of a system with two equations with two unknown factors, parameterized at $h_0$:

$$y_p(h_0, a, b) = y_0$$

$$z_p(h_0, a, b) = 0$$

with $h_0$ determined $y_p = y_{ph0}(h)$
$z_p = z_{ph0}(h)$
are obtained.
Let $h_0 = h_0^+$ for the high part of the lens 6
and $h_0 = h_0^-$ for the low part of the lens 6
then $y_p = y_{p_{h0+}}(h)$ for $h \geq h_\rho(h_0^+)$ and $y_p = y_{p_{h0-}}(h)$ for $h \leq h_\rho(h_0^-)$
The same reasoning applies to $z_p$
In addition $h_0^+ = h_0^+(x)$ and $h_0^- = h_0^-(x)$ where x is the abscissa of the point of the edge 5 of the bender 4 via which the vertical plane passes at right angles to the edge 5 of the bender 4, and wherein the construction of the section of lens 6 previously described is valid.

The curvature of the edge 5 of the bender 4 at its abscissa point x is $C = 1/R(x)$, which, with a point of passage and a condition of tangent parallel to the axis of the xs at $x=0$, defines the edge 5 of the bender 4.

$h_0^+(x)$, $h_0^-(x)$ and $R(x)$ are design parameters of the system.

FIG. 4 illustrates an example of variation of the values for $h_0^+(x)$, $h_0^-(x)$, given on the y axis, according to the abscissa x of the point of the edge 5 of the bender 4, given on the x axis. The abscissae are given in positive and negative values starting from the center of the edge of the x-axis bender 0.

The variations of $h_0^+(x)$, for the high part of the lens 6 are represented by two inclined segments which form a circumflex accent, the point of which corresponds to the center of the edge of the x-axis bender 0. The maximum value $h_0^+(0)$ can be selected to be equal to 0: $h_0^+(0) = 0$. The value of $h_0^+(x)$ decreases from the center of the edge 5 of the bender 4 towards its lateral ends, down to −0.25 mm according to FIG. 4. Good correction of the beam and the cut-off is obtained since, for the high part of the lens 6, the rising light is obtained from the edges of the central images which reach the lateral points of the bender 4.

The variations of $h_0^-(x)$, for the low part of the lens 6, are represented by two inclined segments which form a "V", the point of which corresponds to the center of the edge of the x-axis bender 0. The minimum value $h_0^-(0)$ is selected so as to be less than 0: $h_0^-(0) < 0$, equal to −0.5 mm according to FIG. 4. The value of $h_0^-(x)$ increases from the center of the bender 4 towards its edges, preferably with $h_0^-$ equal to 0 ($h_0^- = 0$) towards its lateral ends. Good correction is obtained since, for the low part of the lens 6, the rising light is obtained from the edges of lateral images which pass through the center of the bender 4.

A specific example of a lens 6 corresponds to the following values.

c=20 mm; c is the distance between O and the intersection of the axis 3 and the curve 5
f (pseudo-focal)=6 mm; T=10 mm; Ri=50 mm;
$e_p$=22.57 mm; $n_l$=1.49 (PMMA); R(x)=−40 mm The path of the rays of light in a section according to a vertical plane at right angles to the edge 5 of the bender 4, at a point on the abscissa x, is illustrated schematically in FIG. 2. A headlight of the anti-fog type has been taken into consideration, with a beam situated below a horizontal cut-off line. The section is taken at a point of the edge 5 for which the focal point $Fh_0^+$ of the high part of the lens is situated vertically relative to the edge 5, below a distance $h_0^+$, whereas the focal point $Fh_0^-$ of the low part of the lens 6 is situated vertically relative to the edge 5, below a distance $h_0^-$, which is greater in absolute value than $h_0^+$. The positions of the focal points could be different from those illustrated in FIG. 2, according to the position of the vertical section plane.

A ray emitted from the center of the source S, situated in the vicinity of a first focal point of the reflector 2, is reflected by the reflector 2 according to a ray which meets the edge 5 of the bender 4, and is contained on the plane at right angles to this edge at the meeting point. This reflected ray is indicated by a single arrow tip. This ray, which is less inclined than the direction b1, is projected from the lens 6 according to a descending direction.

A ray emitted from the edge of the source S closest to the lens 6 is reflected by the reflector 2 according to a ray indicated by two arrow tips, which strikes the bender 4 to the rear of the edge 5, and is reflected by this bender 4, in order to rise towards the lens 6 and meet the high part. This ray, which is less inclined than the direction a1, projects from the lens 6 according to a descending direction.

A ray emitted from the edge of the source S furthest from the lens 6 is reflected by the reflector 2 according to a ray indicated by three arrow tips, which passes to the front of the edge 5 of the bender 4, without being reflected, in order to descend towards the lens 6 and meet the low part. This ray, which is less inclined than the direction b1, projects from the lens 6 according to a descending direction.

In general, the reflector 2 is constructed as described in the aforementioned patent application FR 2 940 404.

The horizontal cut-off is well assured by means of rays which are projected horizontally or in a descending manner.

Figure 5:
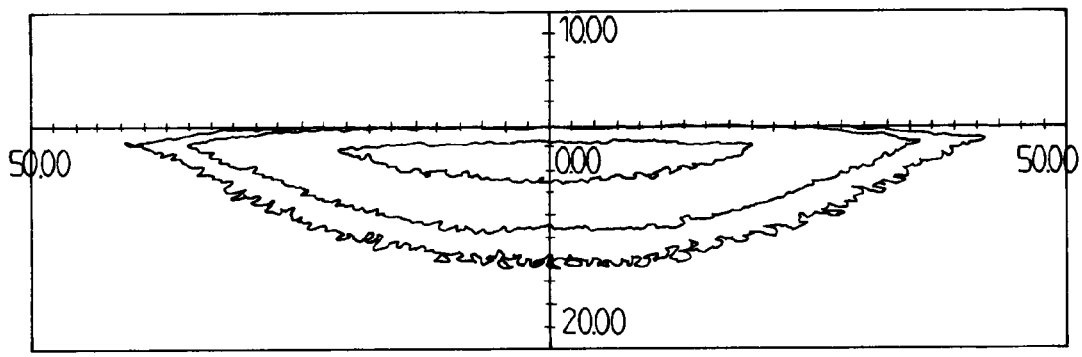
FIG. 5 is a representation of the isolux curves of the beam obtained from the headlight according to the invention.

The general appearance of the beam obtained is illustrated in FIG. 5 by means of isolux curves of the trace of the beam on a screen at right angles to the optical axis. It can be seen that the lighting is virtually zero above the horizontal cut-off line.

Figure 6:
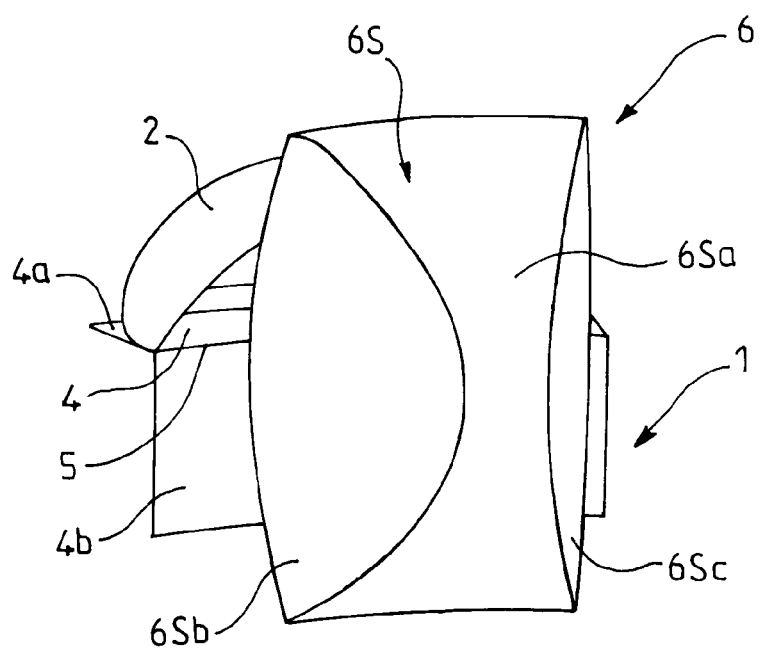
FIG. 6 is a view from the front in perspective of a headlight according to the invention.
Figure 7:
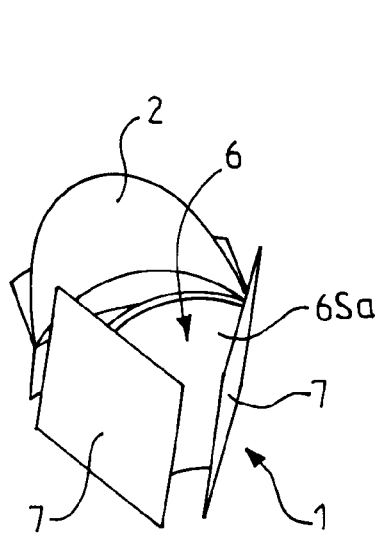
FIG. 7 is a view similar to FIG. 6, illustrating on a smaller scale a variant of the headlight according to the invention.
Figure 8:
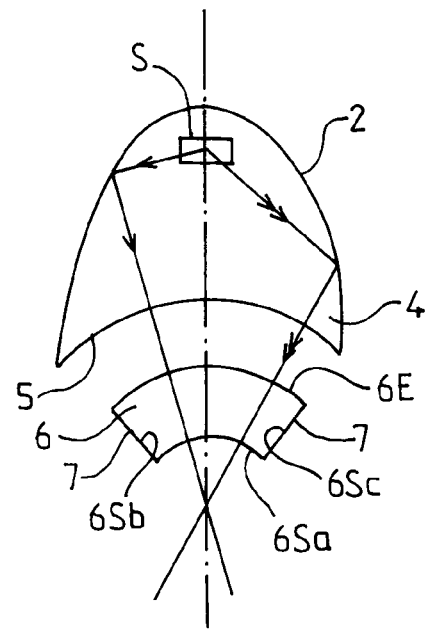
FIG. 8 is a horizontal schematic cross section on an enlarged scale of the headlight in FIG. 7.

An example of a headlight constituted by a convergent module according to the invention can be seen more particularly in FIGS. 6 to 8, which show the reflector 2, with a concave form, inside which there is installed the source of light S, which can be seen in FIG. 8.

The bender 4 comprises a first horizontal flat part 4a which is situated below the reflector 2, and a second vertical part 4b which forms an angle of 90° with the first part 4a. The intersection between the parts 4a and 4b forms the cut-off edge 5, with an arc of a curve which is concave towards the lens 6.

The front surface 6S of the lens 6 comprises three areas. A first central area 6Sa (exit surface) is the only one which is active, and is framed by two flat areas 6Sb and 6Sc.

The surface of the area 6Sa has been determined by means of the calculation previously described. As shown in FIGS. 7 and 8, the cross section of the area 6Sa through a horizontal plane is a concave curve with its concavity facing forwards, in other words on the side opposite the reflector 2. The flat areas 6Sb and 6Sc connect the entry surface 6E of the lens 6 to the area 6Sa, and do not play an optical part in the production of the light beam. Only the part 6Sa is active, and intervenes on the beam.

FIG. 8 illustrates the path of two rays of light obtained from the center of the source of light S, marked respectively with one and two arrow tips, reflected by the reflector 2 on respective vertical planes at right angles to the edge 5 of the bender 4. The vertical planes of the two rays traced are also at right angles to the cross sections via the horizontal plane of the entry surface 6E and the exit surface 6Sa of the lens. FIG. 8 shows the converging beam obtained, the point of convergence of which is situated to the front of the lens 6.

The characteristic form of the lens 6 allows the headlight according to the invention to be easily identifiable, and constitutes an advantage from an esthetic point of view.

The neutral nature of the areas 6Sb and 6Sc can be used advantageously to put opaque walls 7 into place against these areas, without any detrimental impact on the light beams, as illustrated in FIGS. 7 and 8. Despite having a surface which is distinctly smaller than that of the entry surface 6E, the reduced surface of the active area 6Sa does not constitute a handicap for the creation of a cut-off light beam with a converging module.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A headlight for a motor vehicle, in order to provide a cut-off light beam, comprising:
    a collector mirror with an axis;
    a source of light (S) placed in the vicinity of the inner focal point of the collector mirror;
    a substantially flat bender, the reflective surface of which is oriented towards the interior of the collector mirror, and has an edge which is constituted by a flat curve; and
    a lens, situated to the front of the collector mirror and the bender, in order to provide an image of the edge of the bender which defines the cut-off of the beam;
    wherein the lens is determined such that, for each section of the lens, along a plane which is at right angles to the edge of the bender, on a point of this edge, the focal point ($Fh_0$) of said section is at a distance ($h_0$) from the point of the edge of the bender, according to a direction at right angles to the plane of the bender.

2. The headlight according to claim 1, wherein the bender is horizontal, and the focal point ($Fh_0$) of said section is at a vertical distance ($h_0$) from the edge of the bender.

3. The headlight according to claim 1, wherein the distance ($h_0$) is variable according to the position of the point of the edge of the bender.

4. The headlight according to claim 1, wherein, for each section of the lens along a plane which is at right angles to the edge of the bender, on a point of this edge, the high part of the section which is situated above the plane of the bender makes possible a focal point ($Fh_0^+$) which is at a distance ($h_0^+$) from the edge of the bender according to a direction at right angles to the plane of the bender, whereas the low part of the section which is situated above the plane of the bender makes possible a focal point ($Fh_0^-$) which is at another distance ($h_0^-$) from the edge of the bender, according to a direction at right angles to the plane of the bender.

5. The headlight according to claim 4, wherein the distances ($h_0^+$) and ($h_0^-$) of the focal points ($Fh_0^+$) and ($Fh_0^-$) to the edge of the bender vary in inverse proportion, from the center of the edge of the bender towards its lateral ends.

6. The headlight according to claim 5, with horizontal cut-off, wherein, for the high part of the lens, the distance $h_0^+(x)$ from the focal point of a section to the edge of the bender decreases from the center of the edge of the bender towards its lateral ends, and, for the low part of the lens, the distance $h_0^-(x)$ from the focal point of a section to the edge of the bender increases from the center of the edge of the bender towards its lateral ends.

7. The headlight according to claim 6, wherein, for the high part of the lens, the distance $h_0^+(0)$ from the focal point to the edge of the bender is zero ($h_0^+(0)=0$) at the center, this distance becoming negative in the direction of the lateral ends of the edge, whereas, for the low part of the lens, the distance $h_0^-(x)$ from the focal point to the edge of the bender is zero ($h_0^-(0)=0$) at the lateral ends of the edge of the bender, and negative at the center.

8. The headlight according to claim 1 with a convergent module, wherein the lens comprises a front surface with an active area (6Sa) and at least one non-active area (6Sb, 6Sc).

9. The headlight according to claim 8, wherein the surface of the active area (6Sa) is smaller than the surface of the entry surface (6E) of the lens.

10. The headlight according to claim 2, wherein the distance ($h_0$) is variable according to the position of the point of the edge of the bender.

11. The headlight according to claim 2, wherein, for each section of the lens along a plane which is at right angles to the edge of the bender, on a point of this edge, the high part of the section which is situated above the plane of the bender makes possible a focal point ($Fh_0^+$) which is at a distance ($h_0^+$) from the edge of the bender according to a direction at right angles to the plane of the bender, whereas the low part of the section which is situated above the plane of the bender makes possible a focal point ($Fh_0^-$) which is at another distance ($h_0^-$) from the edge of the bender, according to a direction at right angles to the plane of the bender.

12. The headlight according to claim 3, wherein, for each section of the lens along a plane which is at right angles to the edge of the bender, on a point of this edge, the high part of the section which is situated above the plane of the bender makes possible a focal point ($Fh_o^+$) which is at a distance ($h_o^+$) from the edge of the bender according to a direction at right angles to the plane of the bender, whereas the low part of the section which is situated above the plane of the bender makes possible a focal point ($Fh_o^-$) which is at another distance ($h_o^-$) from the edge of the bender, according to a direction at right angles to the plane of the bender.

13. The headlight according to claim 2 with a convergent module, wherein the lens comprises a front surface with an active area (6Sa) and at least one non-active area (6Sb, 6Sc).

14. The headlight according to claim 3 with a convergent module, wherein the lens comprises a front surface with an active area (6Sa) and at least one non-active area (6Sb, 6Sc).

15. The headlight according to claim 4 with a convergent module, wherein the lens comprises a front surface with an active area (6Sa) and at least one non-active area (6Sb, 6Sc).

16. The headlight according to claim 5 with a convergent module, wherein the lens comprises a front surface with an active area (6Sa) and at least one non-active area (6Sb, 6Sc).

17. The headlight according to claim 6 with a convergent module, wherein the lens comprises a front surface with an active area (6Sa) and at least one non-active area (6Sb, 6Sc).

18. The headlight according to claim 7 with a convergent module, wherein the lens comprises a front surface with an active area (6Sa) and at least one non-active area (6Sb, 6Sc).

* * * * *